United States Patent [19]
Greenwood

[11] 3,867,504
[45] Feb. 18, 1975

[54] METHOD OF OPERATING A TIRE MOLD

[75] Inventor: Alan Greenwood, Kent, Ohio

[73] Assignee: The Goodyear Tire & Rubber Company, Akron, Ohio

[22] Filed: Aug. 9, 1973

[21] Appl. No.: 387,052

Related U.S. Application Data

[62] Division of Ser. No. 183,931, Sept. 27, 1971, Pat. No. 3,779,677.

[52] U.S. Cl. .................................. 264/326, 264/315
[51] Int. Cl. .............................................. B29h 5/08
[58] Field of Search ........ 264/315, 326, 36; 425/29, 425/32, 36, 38, 39, 40, 46, 47, DIG. 5

[56] References Cited
UNITED STATES PATENTS 3,776,999  12/1973  LeBlond ............................ 264/315

Primary Examiner—Jan H. Silbaugh
Attorney, Agent, or Firm—F. W. Brunner; R. S. Washburn

[57] ABSTRACT

A method of operating a tire mold in which tread mold segments are moved radially by a coned ring between sidewall plates which bear against the moving segments. Link means connecting each segment to the upper plate enable the segments to be retracted into the ring by moving the upper plate. The link means provides sufficient relative separation between the upper plate and the segments to prevent friction, wear, and binding therebetween during such retraction.

The foregoing abstract is not to be taken as limiting the invention of this application, and in order to understand the full nature and extent of the technical disclosure of this application, reference must be made to the accompanying drawing and the following detailed description.

4 Claims, 7 Drawing Figures

METHOD OF OPERATING A TIRE MOLD

This is a division, of application Ser. No. 183,931 filed Sep. 27, 1971, now U.S. Pat. No. 3,779,677.

This invention relates to a method of operating tire molds of the type commonly referred to as segmented molds wherein that part of the mold which forms the tread portion of a tire is divided into a plurality of segments each of which is movable relatively of the axis, and particularly radially thereof.

It has long been recognized as advantageous to close the respective sidewall mold members to the appropriate position with the tire therebetween before the several segments of the tread mold ring are moved radially inwardly to complete closure of the segmented tire mold. To accomplish this aim one or the other of the sidewall mold members is made to be moved independently of the mechanism which provides for radially moving the segments. While the segments and the mechanism for closing the segments radially can readily be associated either with the lower sidewall mold member and thus usually with the fixed platen in the conventional tire mold press, or with the upper sidewall mold member and thus with the movable upper platen of the conventional press, the latter has been generally preferred particularly in order to provide relatively easier access to the mold for loading and unloading tires.

When the upper platen of a conventional press is raised and then tilted in the well known manner, the segments of a segmented mold extend axially outwardly from the conical closing ring, used commonly to move the segments, and from the platen a considerable distance. It is, therefore, desirable that the segments be retracted axially into the closing ring both to minimize the relatively unstable overhang of the individual segments and to provide adequate clear space above the mold for the employment of conventional press loading apparatus. But when the individual segments are attached by conventional means such as a T-slot and T-block connection to effect the described retraction of the segments into the closing ring, the retracting movements have resulted in excessive wear and even occasional jamming of the conventional sliding connection. This problem has been particularly objectionable because the amount and kind of lubricant useful in connection with the operation of the tire mold are limited. Moreover, the surfaces subject to greatest wear in known constructions are relatively inaccessible.

A principal object, therefore, of the present invention is to obtain the advantages of the above-described segmented molds without the disadvantages referred to. A further object is a method of operating a tire mold of the segmented mold type in which the individual segments can be retracted, repeatedly and without ill effects, toward the upper platen of the tire mold press to obtain a greater amount of clear space directly above the lower mold part.

The foregoing and other objects and advantages which will become apparent or be particularly pointed out in the description which follows are accomplished in accordance with the present invention by a tire mold having a pair of opposed sidewall plates, a plurality of radially movable segments cooperable with the plates to define a tire molding cavity, closing means operable to effect radial movement of said segments, and link means interconnecting at least one segment and one of said plates to provide in response to a movement of the latter a predetermined axial spacing between said segment and the one plate before moving said segment axially in response to further movement of said one plate.

Figure 1:
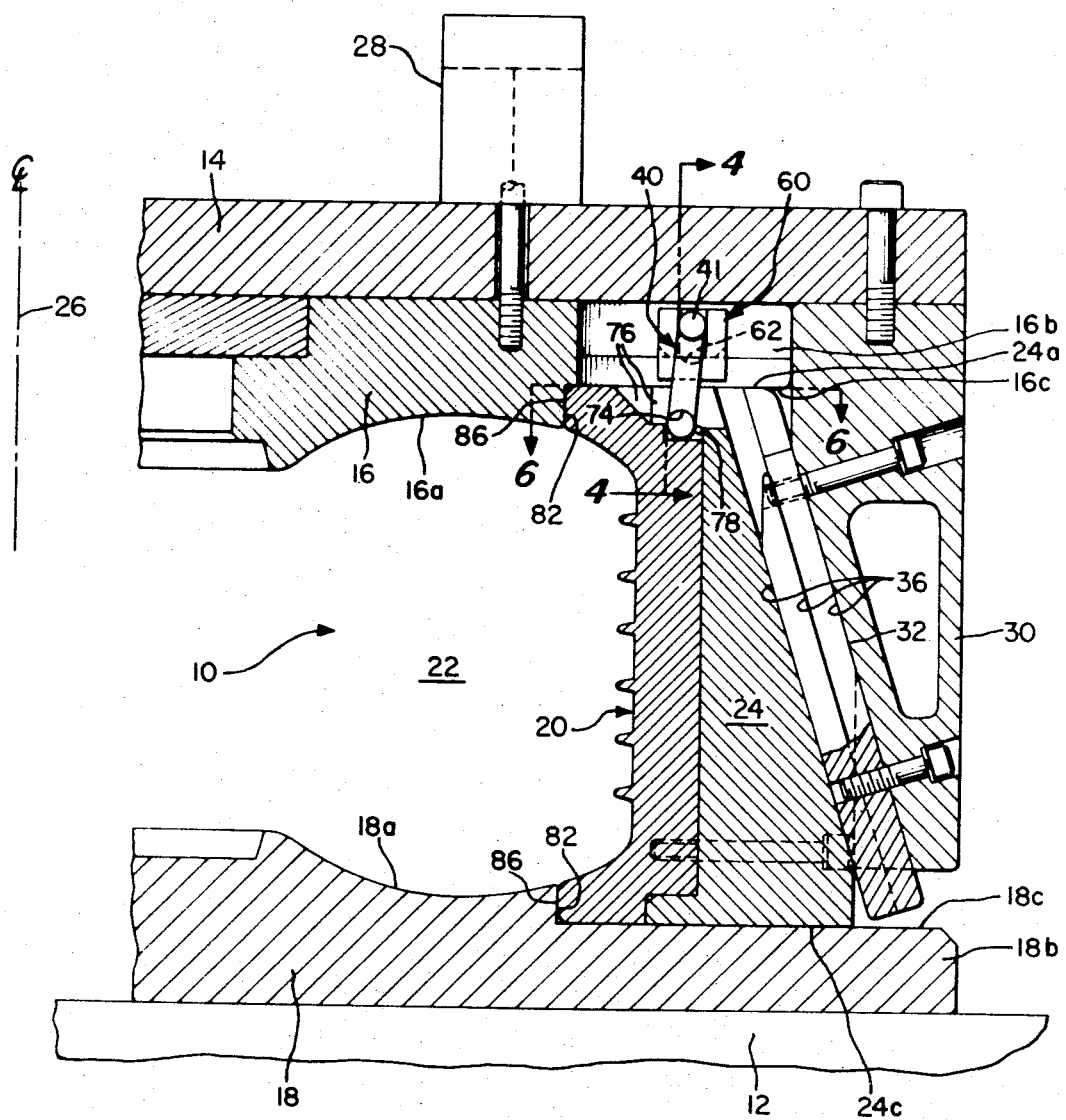
FIG. 1 is a view in axial cross-section of a portion of a segmented tire mold embodying the invention, the mold being shown in closed condition.

Referring to the drawings and particularly to FIG. 1, the tire mold 10 employing the principles of the invention is particularly adapted for use in a conventional tire mold press such as, for example, a Bag-O-Matic tire mold press available from the McNeil Corporation of Akron, Ohio. The conventional tire mold press, as is known, provides a lower platen on which a part of a tire mold is placed and an upper platen upon which another part of the mold is placed. The conventional press includes mechanism by which one of the platens is moved toward and away from the other to close and to open the mold. Inasmuch as such tire mold presses are well known, a portion only of the lower stationary platen 12 is illustrated in the drawings. A portion of the upper, movable, platen 14 is shown in its relation to the tire mold 10.

The tire mold 10 includes a pair of sidewall mold plates 16,18 each of which carries a tire sidewall molding surface 16a,18a in the usual manner. A plurality of tread mold segments 20 collectively cooperate with the sidewall molding surfaces to form a closed tire molding cavity 22. The tread mold segments 20 are mounted respectively on a plurality of carrier segments 24 which are movable inwardly and outwardly with respect to the tire mold axis 26 and particularly radially thereof.

Each of the sidewall mold plates 16,18 is provided, outwardly of the surfaces 16a,18a, with a flange 16b,18b having a plane radial surface 16c,18c normal to the mold axis. The segments 20,24 have upper 24a and lower 24c plane radial surfaces which slidably engage the surfaces of the flanges. In the usual manner, the axial length of the segments 20,24 determines the axial spacing between the sidewall mold plates 16,18 and the segments move radially of the axis, in the final stage of closing movement and in the initial stage of opening movement, in sliding contact with both the respective flange surfaces 16c,18c.

Means for closing the mold by moving the segments radially is provided by a closing ring 30 supported by and movable with the upper platen 14. Each of the carrier segments 24 is provided with an inclined surface 32, as well as guiding surfaces 32', illustrated by the T-slot 34 seen in cross-section in FIG. 6. The respective inclined surfaces 32,32' cooperate with conjugately inclined surfaces 36 carried by the closing ring 30 and define collectively cones convergent on the mold axis 26 outwardly, i.e. upwardly, of the upper platen 14. In the usual manner, radial movement of the respective segments inwardly, toward the axis, is effected by movement of the ring 30 axially toward the lower sidewall plate 18. As the upper platen and ring move downwardly, engagement of the bottom surface 24c of the segment with the flange surface 18c prevents further axial movement of the segment 24 thereby converting the relative motion between the ring 30 and the segment 24 to radially inward movement of the segment. Similarly, axial movement of the ring 30 upwardly relative to the segment 24, which is then being prevented from moving axially by the upper sidewall mold plate 16 causes the segment to move radially outwardly.

Figure 2:
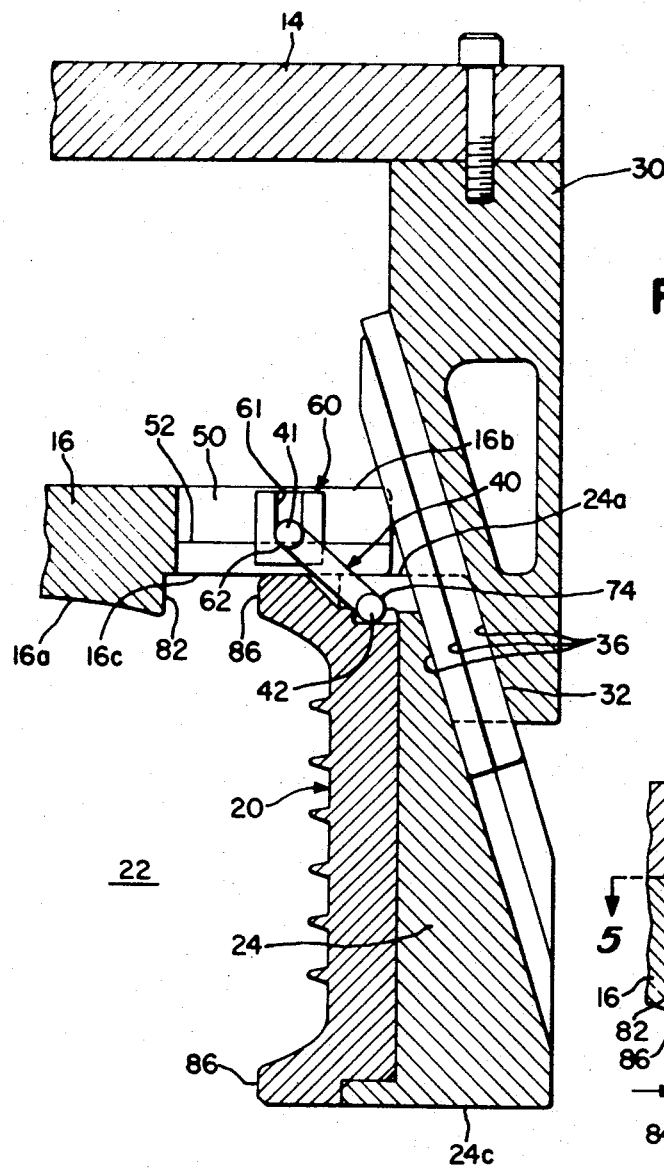
FIG. 2 illustrates schematically the mold of FIG. 1 in an intermediate condition.
Figure 3:
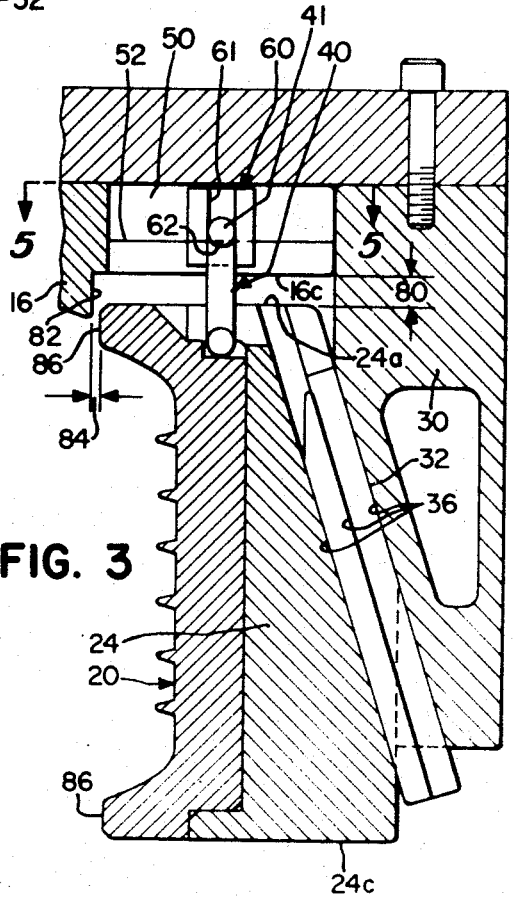
FIG. 3 illustrates schematically the mold of FIG. 1 in a fully open condition of the press.

As may be observed in comparing FIGS. 1, 2, and 3, the upper sidewall mold plate 16 is movable axially relative to the upper platen 14 and to the closing ring 30 supported thereby. Means for effecting such movement is provided by one or more hydraulic cylinders 28 or an equivalent. As is known, this arrangement permits the sidewall plates to be positioned at the appropriate axial spacing, with the respective flanges slidably engaged with the end surfaces 24a,24b of the respective segments, before the segments are moved radially inwardly to complete the closure of the tire mold cavity.

Figure 4:
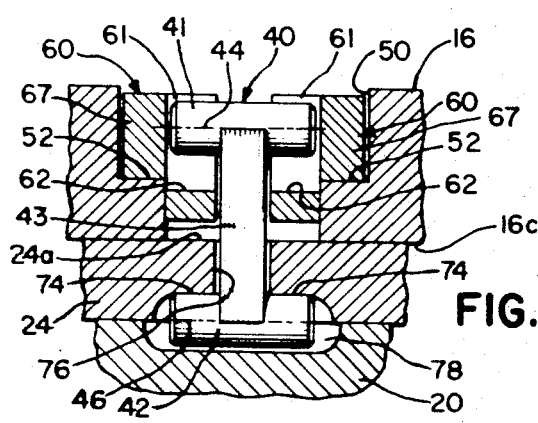
FIG. 4 is a section taken on the line 4—4 of FIG. 1 illustrating a feature of the mold according to the invention.

In accordance with the present invention, link means interconnect while providing for limited relative axial movement between each of the respective segments 24 and the upper sidewall mold plate 16. Referring also to FIG. 4, the link means are provided in the tire mold 10 in the form of a link element 40 having a pair of parallel cross bars 41 and 42 connected rigidly by a connecting portion 43 extending between and joined integrally to the respective cross bars.

Figure 5:
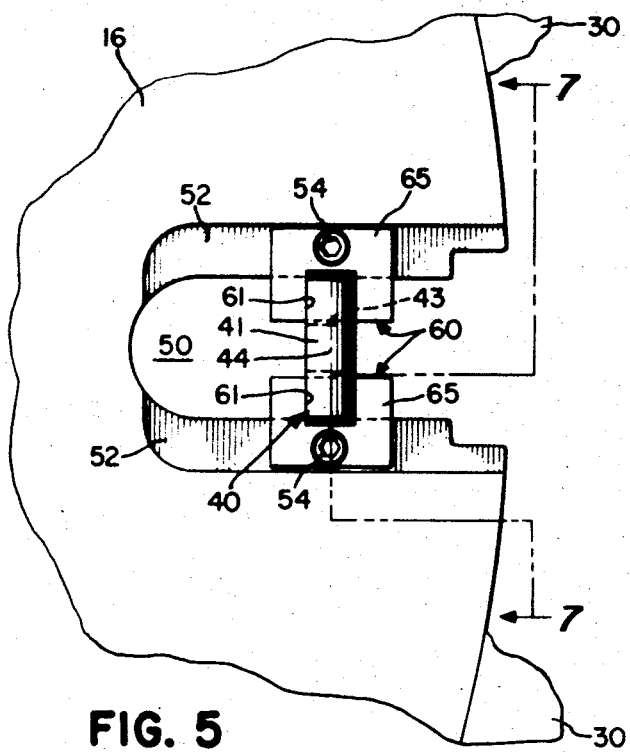
FIG. 5 is a partial plan view taken as indicated by the line 5—5 in FIG. 3.
Figure 7:
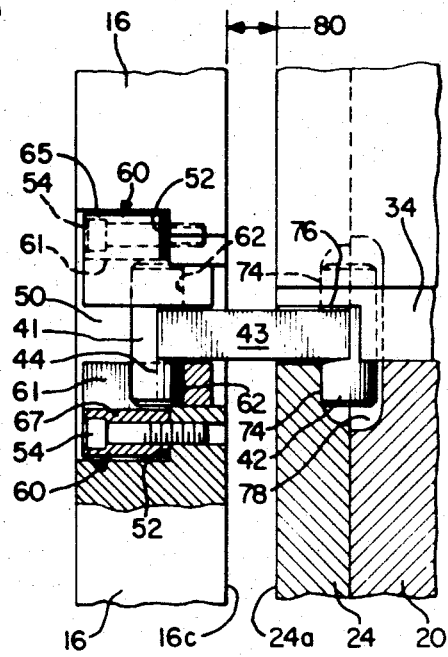
FIG. 7 is a partial elevation view, partly in section, taken as indicated by the line 7—7 in FIG. 5.
Figure 6:
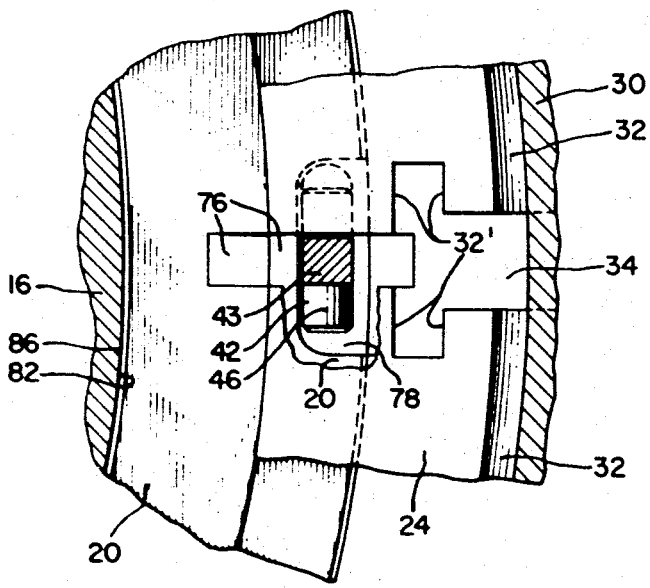
FIG. 6 is a view in section taken as indicated by line 6—6 in FIG. 1.

Turning to FIGS. 5, 6, and 7, a recess 50 formed in the upper sidewall plate 16 provides means accommodating trunnion means 60 which receives the upper cross bar 41 and supports the link element 40 for rotation about the axis 44 of the cylindrical cross bar, as well as for translation of the cross bar 41 within the slot 61, formed in the trunnion means, perpendicular to the direction of movement of the respectively associated segment. The closed lower end 62 of the slot 61 is semicylindrical in form and provides bearing support for rotation of the cross bar 41 therein.

In each of the segments 24, bearing means are provided by a semi-cylindrical pair of seats 74, one at each side of the slot 76 which accommodates the connecting portion 43 of the link element 40, which engage the lower cross bar 42 and permit rotation of the link element 40 about the axis 46 of the lower cross bar. The slot 76 extends radially in both the tread mold segment 20 and in the carrier segment 24, as seen in FIG. 3. A relief 78 is formed in the segment 20 to accommodate the lower portion of the cross bar 42.

The bearing means provided in each of the segments and the trunnion means 60 mounted in recess 50 in the upper sidewall plate 16, in association with each of the respective segments, cooperate with the link means 40 to move each segment with the plate 16. As the plate 16 is moved axially, the segment 24, due to the angular disposition of the element 40, is moved relatively more slowly so that space 80 is opened between the upper surfaces 24a of the segments and the flange surface 16c of the plate. Sliding therebetween is avoided by the relative axial movement provided by the rotation of the link element 40. A comparison of the respective positions of the link element 40 illustrated in FIGS. 1, 2, and 3 will make clear that the individual segments 24 can be moved radially in response to movement of the plate 16 relative to the platen 14 and the closing ring 30 at any time while the segments are spaced away from the lower sidewall mold plate 18. The link means provides a particular advantage in a tire mold in which it is desired to retract the segments 24 axially inwardly into the closing ring 30 while the mold is open, as for example when loading or removing a tire. The invention, and particularly the link means thereof enables the segments 24 to be moved radially in response to the movement of the plate 16, as by the cylinder 28, while the segments are free of sliding contact with the respective plates 16 and 18.

When the mold 10 is in the fully open condition illustrated in FIG. 3, a predetermined space or gap 80 is open between the upper surface 24a of the segment and the flange surface 16c of the upper plate. Also, in this condition, the segment 24 presents very nearly a maximum area of surface contact with the corresponding inclined surfaces of the ring. By so retracting the segments into the ring, they are more securely supported by the ring 30 as the upper part of the mold 10 is tilted when the press is fully opened to provide a clear space above the lower mold part, as for loading and unloading thereof. The increased area of contact likewise provides for improved heat transfer from the platen and the ring into the segments thereby maintaining the segments at relatively higher temperatures to initiate the curing of the next succeeding tire.

It will also be observed that should the press be closed accidentally while the mold 10 is in such open condition, (FIG. 3), the segments 20 are spaced at least slightly farther radially of the axis than are the peripheral edges 82 of the sidewall mold surfaces 16a,18a. This radial spacing, which is represented by the dimension 84, is sufficient to insure that such closure of the press cannot damage the edges 82 of the sidewall mold surfaces or the corresponding surfaces 86 of the tread mold segments 20.

Referring again to FIGS. 1 and 5, the trunnion means 60, which for manufacturing convenience is formed in two blocks 65, is assembled by positioning each block with the long dimension of the slot 61 therein parallel to the ledges 52 formed in the recess 50. With the link element 40 disposed, as shown in FIG. 1, in the bearing means 74 formed in the segment 24, the blocks 65 are moved radially inwardly until the upper cross bar 41 is disposed at the closed end 62 of the slot. The blocks 65 are then turned 90°, about the cross bar 41, to position the long dimension of the slot 61 vertically or at least perpendicular to the direction of movement of the associated segment. The respective bolting lugs 67 which are formed integrally with each block 65 and extend outwardly to rest on the respective ledges 52 are then secured thereto by the cap screws 54.

Operation

The mode of operation of the mold 10 illustrating the invention will have become apparent to persons skilled in the art from the foregoing description. The operation may be summarized by reviewing the operating cycle of the mold beginning with the mold closed condition illustrated in FIG. 1. The curing cycle of the tire within the mold having been completed, the press is actuated to raise the upper platen 14 and with it the closing ring 30. The upper sidewall mold plate 16 initially continues to be urged, by means 28, against the segments 24, maintaining sliding contact at the surfaces 16c–24a of the segment and of the plate. The relative sliding which occurs between the surfaces 32 and 36 of the segment and of the ring causes the segment 24 to move radially outwardly a radial distance sufficient to place the inward periphery 86 of each of the segments radially outwardly slightly beyond the maximum radius of the tire. During this initial phase or stage of opening movement, the lower cross bar 42 of the connecting link element 40 moves radially together with the segment 24 while rotating in the seats 74. This movement causes the upper cross bar 41 to move downwardly without restraint within the slot 61.

At the end of the initial opening phase, the segments 24, the upper plate 16, and the closing ring 30, have assumed the relative positions illustrated in FIG. 2 wherein the link element 40 will be seen to be extended at an angle such that the upper cross bar 41 rests in the lower end 62 of the slot 61. The upper plate 16, at this time, is at or near the lower limit of its relative movement with respect to the platen 14 and to the closing ring 30. As the press continues to open, the upper part of the tire mold which comprises the parts illustrated in FIGS. 2 and 3 continues to rise at least sufficiently to dispose the surfaces 24c completely above the tire which has remained with the lower sidewall plate 18.

After the upper part of the mold has been elevated above the upper surface of the tire, the upper plate 16 is caused to move upwardly, as seen in FIG. 3, relative to the closing ring 30 by the upper plate actuating means, represented by the cylinder 28. This upward movement of the upper plate 16 is begun while the segments 24 and the link element 40 are disposed as illustrated in FIG. 2. By inspection of FIG. 2, it will be seen that as the plate 16 moves upwardly, the link element 40 causes the segment 24 to follow upwardly, but at a lesser rate of travel thereby opening the gap or space 80 between the surface 16c of the flange and the surface 24a of the segment. This gap increases as the upper plate 16 moves upwardly toward the upper limit of its travel, illustrated in FIG. 3, wherein the gap or spacing 80 between the respective surfaces has attained the predetermined distance. It will also be seen that the segment 24 has been retracted axially again within the compass of the closing ring 30.

Because the segments 24 are so retracted into the closing ring 30, the dimension of the upper mold part between the platen 14 and the lower surface 24c of the segment is reduced very nearly to its minimum thereby creating a maximum to space above the lower part of the mold, particularly as the upper platen is tilted away from that space as in the conventional mole press. This facilitates the removal of the cured tire and the placement of a next succeeding tire by conventional tire loading apparatus. Furthermore, it increases the stability of the segments by virtue of their greater length and area of support within the ring. In addition, the maximum of heat transfer contact is provided between the ring and the respective segments so as to maintain their heat contact and temperature at a higher level to advantage.

It will also be noted that the radially inward surfaces 86 of the respective segments which abut the axially extending surface 82 of the respective mold plates are separated by a small radial space 84. This small radial space provides an additional advantage in that, should the press be inadvertently closed, the respective surfaces of the sidewall mold plates and of the segments are prevented from interfering one with the other so as to avoid damage to the edges of the tire molding surfaces which must abut accurately in order to prevent the molding of imperfections in subsequent tires.

While certain representative embodiments and details have been shown for the purpose of illustrating the invention, it will be apparent to those skilled in the art that various changes and modifications may be made therein without departing from the spirit or scope of the invention.

What is claimed is:

1. A method of operating a tire mold having two tire sidewall mold plates, a plurality of tread mold segments, and means for moving said segments radially while in sliding contact with and between said plates during a final phase of mold closing movement and during a first phase of mold opening movement, an improvement in said method comprising, in an additional phase of mold operation while said mold is open after said first phase of mold opening operation and before said final phase of mold closing operation, separating axially of the mold each said segment from each of said sidewall plates to prevent during said additional phase a said sliding contact therebetween, and then moving said segments radially inwardly while said segments are spaced apart from both said plates.

2. A method as claimed in claim 1, wherein said closing means comprises a continuous circumferential rigid ring having therewithin inclined surfaces slidably engaged respectively with correspondingly inclined surfaces on each said segment, and while maintaining axial separation between each segment and each of said sidewall plates retracting said segments axially inwardly into said ring.

3. A method of operating a tire curing mold having a pair of sidewall mold plates and a plurality of radially movable tread molding segments which are moved radially with respect to the mold axis by the cooperation of relatively movable pairs of surfaces oblique with respect to the axis and wherein at least a portion of the heat supplied to effect the curing of a tire within the mold is transmitted by conduction from one to the other of the respective pairs of oblique surfaces, the method comprising first moving said plates axially apart and moving the respective oblique surfaces of said pairs axially in a first direction to effect radially outward movement of the respective segments to permit the removal of a first tire from said mold, then during the interval between said movement of the segments and the placement into said mold of a second tire and while each said plate and the respective axial ends of said segments are spaced apart from and out of contact with each other effecting relative movement between the respective said oblique surfaces in a direction axially opposite of the first said direction, whereby the area of heat transfer contact between said oblique surfaces is increased with respect to the area of heat transfer contact therebetween while said segments are in their radially outwardmost position.

4. A method of operating a tire mold having two sidewall mold plates and a plurality of radially separable tread mold segments comprising moving said mold to an open position facilitating removal of a tire therefrom by moving each segment in a first direction in a plane normal to the axis of the mold while said segment is in sliding contact with each of and between said sidewall mold plates, moving said segment and one of said sidewall plates axially away from the other of said sidewall plates, then moving said one sidewall plate a predetermined distance axially away from said segment, and while continuing to move said one sidewall plate effecting radially inward movement of said segments a predetermined distance short of the radially inward movement thereof which corresponds to the closed condition of said mold.

* * * * *